United States Patent [19]

Tsuboi

[11] Patent Number: 4,457,604

[45] Date of Patent: Jul. 3, 1984

[54] CAMERA HAVING LENS PROTECTION COVER

[75] Inventor: Takayuki Tsuboi, Kanagawa, Japan

[73] Assignee: Canon Kabushiki Kaisha, Tokyo, Japan

[21] Appl. No.: 351,606

[22] Filed: Feb. 23, 1982

[30] Foreign Application Priority Data

Feb. 27, 1981 [JP] Japan .............................. 56-27320[U]
Feb. 27, 1981 [JP] Japan .............................. 56-27321[U]
Feb. 27, 1981 [JP] Japan .............................. 56-27322[U]
Feb. 27, 1981 [JP] Japan .............................. 56-27323[U]

[51] Int. Cl.³ ...................... G03B 11/04; G03B 15/05; G03B 17/18
[52] U.S. Cl. ................... 354/145.1; 354/202; 354/289.12
[58] Field of Search ............... 354/202, 187, 253, 145, 354/288, 287, 289; 350/587

[56] References Cited

U.S. PATENT DOCUMENTS

| 169,917 | 11/1875 | Nystrom | 350/587 |
| T896,020 | 3/1972 | Beach | 354/289 |
| 3,878,548 | 4/1975 | Ettischer | 354/268 |
| 4,283,132 | 8/1981 | Engelsmann et al. | 354/202 |

FOREIGN PATENT DOCUMENTS 54-47644 4/1979 Japan .............................. 354/289

Primary Examiner—John Gonzales
Attorney, Agent, or Firm—Toren, McGeady and Stanger

[57] ABSTRACT

A lens protection cover is contained within a barrel ahead of the objective lens, and opening and closing of this lens protection cover is performed by an actuator operable along the periphery of the lens barrel, whereby it is possible not only to protect the objective lens when not in use, but also to permit camera operation to be controlled by the open and closed positions of the lens projection cover so that faulty operation is prevented.

7 Claims, 9 Drawing Figures

CAMERA HAVING LENS PROTECTION COVER

BACKGROUND OF THE INVENTION

1. Field of the Invention:

This invention relates to cameras having lens protection covers ahead of the objective lenses thereof when not shooting, and more particularly to cameras with the lens protection cover opening and closing through an actuator.

2. Description of the Prior Art:

In the past, cameras have been provided with lens protection caps attachable to and detachable from the lens housing.

The objective lens must be protected from the adherence of dust, stains or the like which will result in a reduction of the imaging performance, and from damage by hard objects directly hitting the lens at all times except when shooting, that is, at times when the camera is being carried or stored.

Such typical lens protection caps have, however, two drawbacks as follows: The first one is that when shooting, the detached protection cap must be kept either in a pocket of the photographer's garment, or on a nearby shelf, for example, so that the reattachment of the lens protection cap will be often overlooked, and in the latter case it will often be missed.

The second drawback which is encountered with cameras, other than the type in which an object to be photographed is viewed through the objective lens as in the single lens reflex camera, is that the photographer will often forget to take off the lens protection cap before shooting. Particularly with recently developed automatic exposure cameras and automatic focus cameras, the photographer accustoms himself to not manually setting the diaphragm and focus, and therefore forgets the otherwise indispensable diaphragm presetting ring and distance adjusting ring. Accordingly, he is unaware of the lens protection cap still on the front of the lens mounting.

To eliminate these two drawbacks, there has been proposed a camera in which the releasably attached lens protection cap covers so widely that is also extends over the finder window or the release button. This type cap, however, because of its increased size and complexity, intensifies the first drawback so that the availability of places for accomodation at the time of shooting is largely reduced, and therefore the manageability of the camera is also more troublesome.

To solve such problems, an attempt has been made to construct a camera with a slidingly movable lens protection member supported on the front panel of the camera housing to shut and open the lens mounting portion as, for example, in U.S. Pat. Nos. 4,171,894 and 4,189,222. Such a lens protection member though able to solve the above problems to some extent, has the following alternative drawbacks.

Such a lens protection member is required to cover not only the front panel of the camera housing, but also the top and bottom panels thereof, thus contributing to increased camera bulk and size. Another drawback is increased production cost. The protection member must also be opened and closed directly by hand. An additional problem is that quick and easy opening and closing is difficult.

SUMMARY OF THE INVENTION

With the foregoing in mind, it is an object of the present invention to provide a camera having a lens protection cover of very simple structure built therein without causing a great increase in camera bulk and size.

Another object of the present invention is to provide a camera having a lens protection cover with an actuator which also serves as a camera control which is dependent on opening and closing of the lens protection cover so that there is no possibility of faulty operation or a fruitless shot.

These and other objects of the invention will become apparent from the following detailed description of the embodiments thereof.

DETAILED DESCRIPTION OF THE PREFERRED EMBODIMENTS

Figure 1:
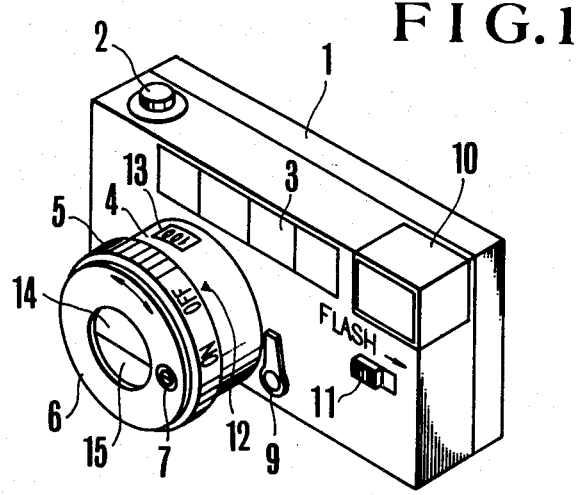
FIG. 1 is a perspective view of one embodiment of a camera having a lens protection cover, according to the present invention.

In FIG. 1 there is shown a camera housing 1; a release button 2; a finder 3; a lens mounting 4 formed as a unit with the camera body 1 having cut thereon an index 12 for mode selection.

A cover actuator ring 5 assumes the illustrated position as moved from ON to OFF. A name ring 6 is provided in front of the lens barrel 4, having a window 7 formed in a portion thereof to permit light from the object to be photographed to reach a photo-sensitive element (not shown) for exposure control.

The apparatus includes a lever 4 for setting a self-timer mode; a strobe light 10; a control member 11 for popping up the strobe light 10; and an ASA display portion 13.

Figure 2:
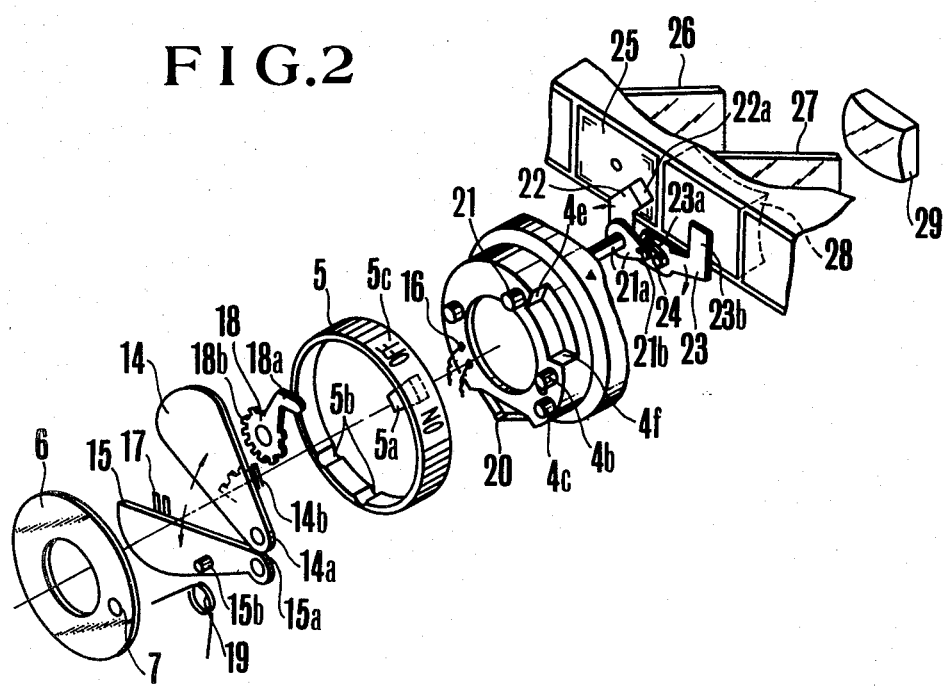
FIG. 2 is an exploded, perspective view illustrating a practical example of the opening and closing mechanism of a protection cover.

Protection cover blades 14 and 15 for an objective lens (not shown) are positioned between the name ring 6 and the objective lens (not shown) and are contained as a whole in the lens mounting. The protection cover blades 14 and 15 are pivotally mounted on respective shafts 4b and 4c in the barrel 4, as illustrated in FIG. 2, and have geared portions 14a and 15a which mesh with each other, so that they open and close symmetrically. Electrical power source terminals 16 control the state of the camera 1. When the protection cover blade 15 reaches the fully opened position, the two terminals 16 are electrically connected with each other by a switch contact 17 fixed to the protection cover blade 15. Thereby camera operation is rendered possible.

An intermediate gear 18 is fixed to one end of a rotary shaft 21, which is rotatably supported on the barrel 4. A projected portion 5a is fixed to the cover actuator ring 5 and upon counterclockwise movement of the cover actuator ring 5 engages an arm 18a of the intermediate gear 18 and turns the intermediate gear 18 along with its shaft 21 counterclockwise, as viewed in FIG. 2. Also, since a toothed portion 18b of the intermediate gear 18 always meshes with a toothed portion 14b of the protection cover blade 14, the counterclockwise movement of the intermediate gear 18 is transmitted to the protection cover blades 14 and 15, thereby the protection cover is opened. A spring 19 always presses a pin 15b on the protection cover blade 15 in a direction which closes the protection cover 15 (in a clockwise direction as viewed in the drawing).

A click spring 20 is fixed to the barrel 4. A hump of this detent spring 20 drops into one of two notches 5b when the protection cover is opened or closed, that is, when the cover actuator ring 5 is set in an ON or OFF position. Thereby the photographer is given the impression that mode selection is completed, and it effects latching of the protection cover 14, 15 and the actuator 5 in the opened position against the force of the return spring 19.

The shaft 21 of the intermediate gear 18 rotates in unison with the intermediate gear 18, and has a plate portion 21a at the opposite end thereof. Furthermore, the plate portion 21a has a pin 21b carried thereon. In this plate portion 21a, a display portion light shielding plate 22 is unitary therewith, and its opaque portion 22a is positioned in front of a finder mark portion 25 so that it releasably covers the mark in response to the cover actuator ring 5. Light passing through the finder mark portion 25 enters through an eyepiece 29, reaching the eye of the photographer as a display in the finder.

A light shielding lever 23 is pivotally mounted on a shaft 24 and has an elongated slot 23a at one end thereof in which is engaged the pin 21b of the plate portion 21a, and at the opposite end an opaque portion 23b. This light shielding portion 23b enters and retracts from the finder field of view in response to rotative movement of the plate portion 21a.

Light from the object after having passed an objective lens 28 is directed through a half mirror 27 and the eyepiece lens 29 to the eye of the photographer.

Figure 3:
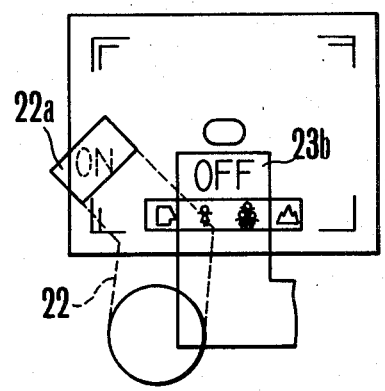
FIGS. 3 and 4 are plan views of the finder viewing field in the apparatus of FIG. 2.

FIG. 3 illustrates the finder viewing field when the camera is set in a position where the protection cover is closed. The opaque portion 22a of the light shielding plate 22 shuts off an area labelled "ON" in the finder mark portion 25, while "OFF" appears as a semi-transparent display in the finder viewing field. Also, at this time, the light-shielding portion 23b of the light shielding lever 23 is a background for the letters "OFF" in the finder viewing field.

Figure 4:
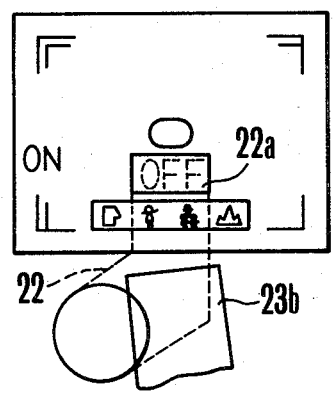

FIG. 4 illustrates how the finder viewing field looks when the camera is set in another position when the protection cover is open. The opaque portion 22a of the light shielding plate 22 shuts off an area of "OFF" in the finder mark portion 25, while "ON" semi-transparently appears in the finder viewing field. Also, at this time, the light shielding portion 23b of the light shielding lever 23 is retracted from the finder viewing field.

In FIG. 2, when the cover actuator ring 5 is turned counterclockwise to change from OFF mode to ON mode, the projecting portion 5a of the cover actuator ring 5 turns in unison with the cover actuator ring 5, then abuts the arm 18a of the intermediate gear 18, and turns the intermediate gear 18 counterclockwise. On the other hand, since the toothed portion 18b of the intermediate gear 18 meshes with the toothed portion 14b of the protection cover blade 14, counterclockwise movement of the intermediate gear 18 causes clockwise movement of the protection cover blade 14. Also, since the toothed portion 15a of the protection cover blade 15 meshes with the toothed portion 14a of the protection cover blade 14, clockwise movement of the protection cover blade 14 directly causes counterclockwise movement of the protection cover blade 15. Thus, the two protection cover blades 14 and 15 move almost symmetrically upwards and downwards respectively against the bias force of the spring 19.

When the protection cover blades 14 and 15 are retracted from the effective aperture opening of the objective lens, the contact 17 touches the electrical power source terminal 16 throwing the electrical power source switch. The detent spring 20 drops into the detent notch 5b of the cover actuator ring 5 and, at the same time, the projection portion 5a abuts the stopper portion 4e of the barrel 4. Thus, the cover actuator ring 5 stops moving, and the camera is ready for shooting.

At this time, the unitary shaft 21 and plate portion 21a cooperating with the intermediate gear 18 turn counterclockwise. This causes the light shielding portion 22a of the light shielding plate 22, which is unitary with the plate portion 21a, to move away from a position covering the letters "ON" to cover the letters "OFF" in an area near the center of the finder viewing field. Also, since the pin 21b of the plate portion 21a engages in the slot 23a of the light shielding lever 23, the light shielding lever 23 turns clockwise in response to the counterclockwise movement of the plate portion 21a. Then, when the opaque portion 22a of the light shielding plate 22 formed as a unit with the plate portion 21a covers the letters "OFF", the light shielding portion 23b of the light shielding lever 23 moves away from the finder viewing field.

At this time, the view in the finder is changed from that illustrated in FIG. 3 to that illustrated in FIG. 4.

The change from ON mode to OFF mode occurs when the cover actuator ring 5 is turned clockwise, as viewed in the drawing. Though the protection cover blade 15 is urged clockwise by the spring 19, as viewed in the drawing, the detent spring 20 in engagement with the ON-side detent notch of the click 5b holds the protection cover blades 14 and 15 stationary in the open position by virtue of the gearing engagements of the toothed portions 14a and 15a with each other and of the toothed portions 14b and 18b with each other and the abutting engagement of the armed portion 18a of the intermediate gear 18 with the projecting portion 5a of the cover actuator ring 5. When the cover actuator ring 5 is turned clockwise, as viewed in the drawing, the spring 19 drives the protection cover blades 14 and 15 in a closing direction, while the intermediate gear 18 is turned clockwise following the projecting portion 5a of the cover actuator ring 5. At this time, the switch contact 17 moves away from the electrical terminals 16 cutting off the camera's electrical energy supply. Soon thereafter the protection cover 14, 15 is fully closed, and the intermediate gear 18 is also stopped. The cover actuator ring 5 is turned until the detent spring 20 drops in the detent notch 5b and the projected portion 5a abuts the stopper 4f.

During this time, the operation of the light shielding plate 22 and the light shielding lever 23 reverses direction from that above, so that the indication in the finder viewing field changes from that illustrated in FIG. 4 to that in FIG. 3.

It is to be noted here that though this embodiment has been described as alternatively displaying the words "ON" and "OFF", it is, of course, possible to use only "OFF". Another variation is that instead of using the letters "ON" and "OFF", equivalent symbols, pictographs and colors may be used. It is further noted that in this embodiment, the light shielding lever 23 is provided to improve the contrast of the "OFF" mark to the brightest object or to a special color tone, and therefore this provision is not always necessary.

Figure 5:
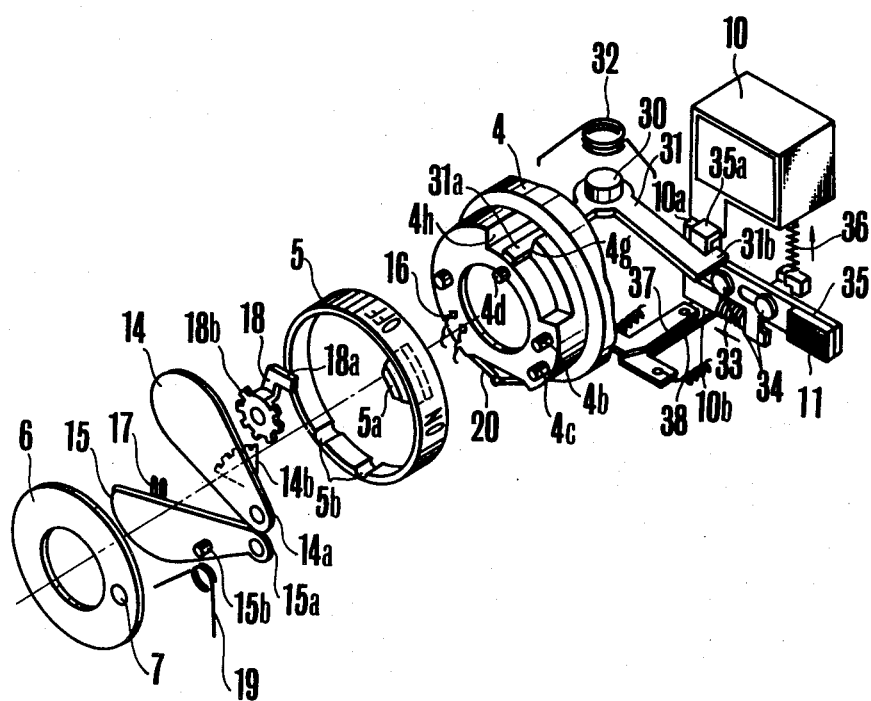
FIG. 5 is an exploded, perspective view of another embodiment of the present invention.

FIG. 5 illustrates another embodiment of the present invention. When the protection cover is closed, the mode selection control is locked, and the same reference numerals have been employed to denote parts similar to those shown in FIG. 2.

The intermediate gear 18 is rotatably supported on a shaft 4d provided in the barrel 4. Also, a lock lever 31 is pivotally supported on a shaft 30 and urged counterclockwise by a spring 32, but its range of pivotal movement is limited by its one arm 31a abutting a shoulder 4g of the barrel 4 in the illustrated position.

The one arm 31a extends into the path of movement of the projecting portion 5a of the cover actuator ring 5 so that as the cover actuator ring 5 is turned counterclockwise, when an intermediate point on the path from "OFF" to "ON" is reached, the projecting portion 5a strikes it. A slide 35 is movable to the right and is guided by pins 34. The slide 35 is formed as a unit with a mode changeover control member 11, and is urged by a spring 33 in a direction indicated by an arrow. In one end of the slide 35 there is a pawl 35a, and this, when engaging a lock portion 10a of a strobe light 10, holds the strobe light 10 which is urged upwards in the illustrated position.

The lock lever 31 has another arm 31b which restrains the slide 35 from leftward movement at its engagement portion 35a, so that even when the control member 11 is intentionally actuated, it cannot move.

Strobe light contacts are identified by the numerals 37 and 38. In the illustrated position, the contact 38 is pushed down by a bottom face 10b of the strobe light 10 so that the contacts 37 and 38 are not electrically connected with each other.

To operate this type of camera, the operator first turns the cover actuator ring 5 counterclockwise. As the projecting portion 5a turns in unison therewith, it abuts the arm 18a of the intermediate gear 18 and, while maintaining the abutting engagement therewith, turns the intermediate gear 18 counterclockwise.

Since the toothed portion 18b of the intermediate gear 18 meshes with the toothed portion 14b of the protection cover blade 14 as in the previous embodiment, counterclockwise movement of the intermediate gear 18 causes clockwise movement of the protection cover blade 14.

Furthermore, since the toothed portion 15a of the protection cover blade 15 meshes with the toothed portion 14a of the protection cover blade 14, clockwise movement of the protection cover blade 14 causes counterclockwise movement of the protection cover blade 15. Thus the protection cover blades 14 and 15 are opened as they move almost symmetrically upwards and downwards against the bias force of the spring 19.

At a time during the opening operation of the protection cover blades 14, 15, the projecting portion 5a of the cover actuator ring 5 abuts on the one arm 31a of the lock lever 31 and turns the lock lever 31 clockwise against the bias force of the spring 32, thereby the other arm 31b is disengaged from the engagement portion 35a of the slide 35. When the cover actuator ring 5 is turned a short distance further in the counterclockwise direction, the detent spring 20 drops in the detent notch 5b to latch the cover acuator ring 5. At this time, the lock lever 31 is stopped with its arm 31 abutting the shoulder 4h of the barrel 4.

With the camera in this position, when a flash exposure is desired, the operator pushes the control member 11 to the right against the bias force of the spring 33. As the slide 35 moves in the same direction, the engagement portion 35a is unlatched from the lock portion 10a of the strobe light 10, and the strobe light 10 then pops up in an upward direction. At this time, the strobe light contact 38, which has so far been displaced by the bottom face 10b of the strobe light 10 is electrically connected with the opposite strobe light contact 37 as the strobe light bottom portion 10b retracts upwards. Thus, charging of a storage condenser (not shown) starts.

After the flash exposure has been completed, when the photographer pushes the strobe light 10 down into the camera body 1, the slide 35, which has so far been displaced to the right in abutting engagement with the side surface of the strobe light 10, then returns to the illustrated position under the action of the spring 33, so that the strobe light 10 is latched in the illustrated position and electrical conduction between the strobe light contacts 37 and 38 ends.

Furthermore, the photographer closes the lens protection cover 14, 15 by turning the cover actuator ring 5 clockwise. Then the lock lever 31 is turned counterclockwise by the bias force of the spring 32, and, when it reaches the illustrated position, its one arm 31a abuts the shoulder 4g of the barrel 4, thus stopping further movement of the lock lever 31. Also, at this time, the intermediate gear 18 turns clockwise, closing the protection cover 14, 15 under the action of the spring 19. It is, therefore, in this position that even if the control member 11 on the camera housing is accidentally pushed to the right, the engagement of the pawl 35a of the slide 35 with the arm 21b of the lock lever 31 keeps the control member 11 from moving so that the strobe light 10 never pops up, and the strobe light contacts 37 and 38 remain in the non-conducting state.

Figure 6:
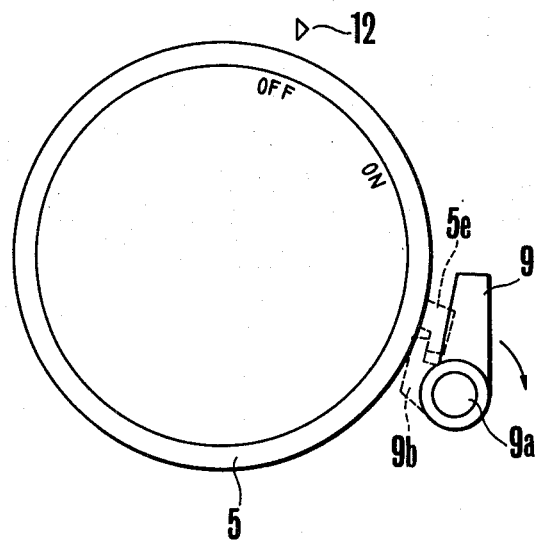
FIG. 6 is an elevational view of a modification of the mechanism of FIG. 5 with the self-lever made lockable.

In the embodiment of FIG. 6, further provision is made for locking a self-timer conrtol lever 9 from actuation by means of the position of the cover actuator ring 5.

In this drawing, a latch pawl 5e is fixed to the cover actuator ring 5 and engages a bent or stepped portion 9b of the self lever 9 when the cover actuator ring 5 is in the "OFF" position. This engagement prohibits pivotal movement of the self lever 9 about a shaft 9a so that the photographer cannot switch the camera to the self mode as long as the protection cover 14, 15 is closed.

Figure 7:
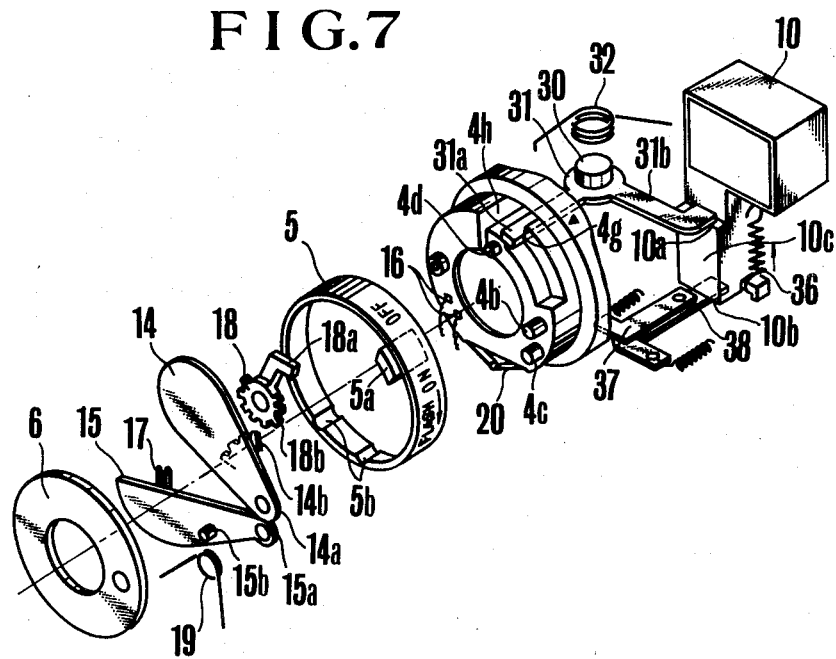
FIG. 7 is an exploded, perspective view of still another embodiment of the invention.

FIG. 7 illustrates still another embodiment of the present invention, where the cover actuator ring 5 serves as a mode selector for switching the camera to the flash exposure mode. The embodiment of this drawing is different from that of FIG. 5 in that the arm 31b of the lock lever 31 directly latches the engagement portion 10b of the strobe light 10 and that when the cover actuator ring 5 is turned counterclockwise beyond the "ON" position (to a position labelled "FLASH" in the drawing), the arm 31a of the lock lever 31 engages the projected portion 5a of the cover actuator ring 5, thereby the lock lever 31 is turned clockwise.

The process for opening the protection cover 14, 15 is similar to that in the previous embodiment. After the protection cover 14, 15 has been opened, when the cover actuator ring 5 is further turned counterclockwise, since the arm 18a of the intermediate gear 18 escapes from the path of movement of the projection portion 5a of the cover actuator ring 5 as it turns, motion of the cover actuator ring 5 is no longer transmitted to the protection cover blades 14 and 15. The projection portion 5a then engages the arm 31a of the lock lever 31 and moves it clockwise against the bias force of the spring 32. Therefore, the opposite arm 31b of the lock lever 31 is disengaged from the detent portion 10a of the strobe light 10, pops up the strobe light 10 under the action of the spring 36 and also closes the strobe light contacts 37 and 38, or turns on the strobe light switch.

Further rotation of the cover actuator ring 5 causes one arm 31a of the lock lever 31 to strike the shoulder of the barrel 4. Therefore, the cover actuator ring 5 is prohibited from further rotational movement. Also, when the photographer removes his hand from the cover actuator ring 5 in this position, the lock lever 31 and the cover actuator ring 5 are turned by the action of the spring 32. That motion stops when the opposite arm 31b of the lock lever 31 abuts the wall portion 10c of the strobe light 10. At this time, the cover actuator ring 5 does not return until the "ON" position is reached.

After the flash exposure has been completed, when the strobe light 10 is pushed down into the camera by hand, the wall 10a engages the arm 31b of the lock lever 31 and the lock lever 31 turns counterclockwise under the action of the spring 32. The cover actuator ring 5 also returns to the "ON" position.

At this time, the arm 18a of the intermediate gear 18 is pressed against the inner surface of the projecting portion 5a of the cover actuator ring 5 so that the protection cover blades 14 and 15 are securely positioned in the open position. When the protection cover 14, 15 is to be used, the photographer further turns the cover actuator ring 5 clockwise. Since the protection cover blades 14 and 15 are urged to close by the bias force of the spring 19, the intermediate gear 18, while remaining in abutting engagement on the projecting portion 5a of the cover actuator ring 5, turns clockwise, and the protection cover 14, 15 is closed.

It is noted that though the above embodiment has been described as utilizing the cover actuator ring in switching the camera between daylight and flash exposure modes, it is not limited to the flash exposure mode and may be otherwise applied to other special exposure modes. For example, it may include a self exposure mode, and two or more selectively switched special exposure modes.

Figure 8:
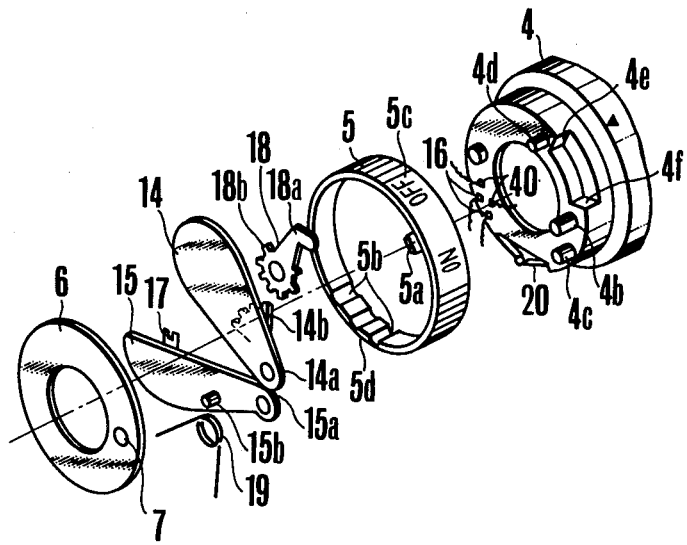
FIG. 8 is an exploded, perspective view of still another embodiment of the invention.

FIG. 8 illustrates another embodiment of the present invention in which during opening or closing of the protection cover 14, 15, a battery check is made.

In this FIG., check terminals 40 give a warning whether or not an electrical power source or battery is normal; and electrical source terminals are identified by the numeral 16. The two pairs of terminals 40 and 16 are electrically connected with each other in each pair by the contact 17 which is unitary with the protection cover blade 15 when the protection cover blade 15 operates. The check terminals 40 are electrically conducted once between the initiation and termination of the opening and closing operations of the protection cover blade 15, and the electrical power source terminals 16 are connected when the protection cover blade 15 fully retracts from the effective diameter of the objective lens.

Figure 9:
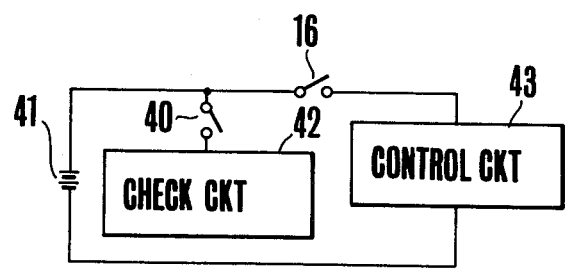
FIG. 9 is an electrical circuit diagram of a control circuit in the embodiment of FIG. 8.

A detent notch 5d is entered by the detent spring 20 when the contact 17 lies across the check terminals 40. The cover actuator ring 5 can be held in the battery checking position by the detent notch 5d. Referring to FIG. 9, there is shown a checking circuit 42 for checking the voltage of an electrical power source or battery 41 when it is connected to the battery 41 as the terminals 40 are connected. The checking circuit 42 produces a warning signal when the voltage of the battery 41 is below a satisfactory operating level. A control circuit 43 is connected, upon establishment of a conducting state of the terminals 16 by the contact 17, to the battery 41 so that the operation of the camera is controlled.

The operation of the mechanism of FIG. 8 is as follows: When the cover actuator ring 5 is turned counterclockwise (as viewed in the drawing) from the "OFF" position to the "ON" position, disengagement of the detent spring 20 and the detent notch 5b of the cover actuator ring 5 takes place, and the projecting portion 5a of the cover actuator ring 5 abuts the arm 18a of the intermediate gear 18 and then turns this counterclockwise. Since the geared portion 18b of the intermediate gear 18 meshes with the toothed portion 14b of the protection cover blade 14, counterclockwise movement of the intermediate gear 18 causes clockwise movement of the protection cover blade 14, as viewed in the drawing. Since the protection cover blades 14 and 15 mesh with each other at their respective toothed portions 14a and 15a, clockwise movement of the protection cover blade 14 causes counterclockwise movement of the protection cover blade 15 against the force of the spring 19. Thus, the protection cover blades 14 and 15 are opened as they move almost symmetrically upwards and downwards.

When the protection cover blade 15 slightly opens, the contact 17, which is unitary with the protection cover blade 15, contacts the battery voltage checking terminals 12. Thereby the terminals 12 are electrically connected with each other. In this way, the battery voltage checking circuit 42 measures the actual voltage of the battery in the camera. If an abnormal condition is detected, the photographer is notified by a previously provided means such as a buzzer (not shown).

When the cover blades 14 and 15 are opened further, the contact 17 moves away from the battery voltage checking terminals 12. Then when the cover blades 14 and 15 are fully opened outside the effective diameter of the objective lens, the contact 17 connects the battery terminals 16 so that the control circuit 43 is supplied with the necessary current for exposure.

When the cover blades 14 and 15 are still further slightly opened, the detent spring 20 drops in the detent notch 5b of the cover actuator ring 5, and the projecting portion 5a of the cover actuator ring 5 abuts the stopper portion 4e of the barrel 4. Therefore, the cover actuator ring is stopped from further movement. Thus, the camera is ready to shoot.

It is noted that, according to this embodiment, it is also possible that even in closing the protection cover blades 14 and 15, where the contact 17 electrically connects the terminals 12 with each other for a time, a battery voltage check may be performed at this time.

The present invention has a lens protection cover built into the interior of the barrel at the front of the objective lens, and this lens protection cover opens and closes in response to an actuator member operable along the periphery of the lens barrel, thereby the objective lens is protected from damage when not shooting. It is, therefore, possible to provide a camera having a built-in protection cover while the very simple structure is preserved and there is no unduly large increase in camera bulk and size. That is, according to the present invention, the protection cover and a control mechanism for opening and closing the protection cover can be arranged collectively ahead of the objective lens. The advantage is that the device itself can be compact, and the drive connecting mechanism between the actuator member and the protection cover can be simply constructed.

Another feature of the present invention is that, depending upon the opening and closing of such a protection cover, the display in and the operation of the camera are controlled so that such a camera cannot suffer from faulty operation. That is, according to the present invention, whether the protection cover is closed or open can be indicated in the view finder field. Thereby it is possible to avoid shooting with the protection cover closed. Also, since the present invention provides that if the protection cover is in the closed position, the camera cannot be switched to the flash exposure mode and the self-timer exposure mode so that as the camera is carried with the protection cover closed, even when the mode selector member is struck by something, there is no possibility of accidentally switching the camera to the flash mode. This would otherwise result in wasteful consumption of electrical energy as the storage condensor for flash light energy absorbs current from the battery. Another advantage of the invention is that such an accident can be avoided. If the camera were accidentally switched to the self mode by a similar cause, a shutter chance would be missed when shooting. Such an accident can also be avoided.

Furthermore, the present invention provides an actuator member for the protection cover which also serves as a mode selector member with the advantage that the camera's manageability is greatly improved. The present invention makes it also possible to carry out a voltage check of the electrical power source while opening or closing the protection cover.

What is claimed is:

1. In a camera, an improvement comprising:
    (a) a lens protection member provided on the camera so as to be movable between a first position at which said member protects the front face of the photographing lens provided on the camera and a second position at which said member retires from the front face of the photographing lens;
    (b) an operation member for changing over the photographing mode from the ordinary photographing mode to another photographing mode by changing over from a first state to a second state; and
    (c) a lock member in operative engagement with the movement of the lens protection member for locking the operation member in the first state when the lens protection member is at the first position.

2. A camera according to claim 1, wherein the operation member sets the camera in the self-timer mode when the first state is changed over into the second state.

3. A camera according to claim 1, wherein the operation member sets the camera into the flash light photographing mode when the first state is changed over into the second state.

4. A camera according to claim 3, further comprising:
    (d) flash light means; and
    (e) switching means for starting the light emitting preparation operation of the flash light means when the operation member is changed over from the first state to the second state.

5. In a camera, an improvement comprising:
    (a) a lens protection member provided on the camera movable between a first position at which said member protects the front face of the photographing lens and a second position at which said member retires from the front face of the photographing lens;
    (b) a first operation member for moving the lens protection member between the first and the second position;
    (c) a second operation member for changing the photographing mode from the ordinary photographing mode to another photographing mode when a first state is changed over to a second state; and
    (d) a lock member for locking the second operation member in the first state, said lock member releasing the locking of the second operation member when the lens protection member is set in the second position by the operation of the first operation member.

6. In a camera, an improvement comprising:
    (a) a lens protection member provided on the camera so as to be movable between a first position at which said member protects the front face of the photographing lens provided on the camera and a second position at which said member retires from the front face of the photographing lens;
    (b) an operation member for moving the lens protection member between the first and the second position;
    (c) flash means capable of emitting a flash movable between a first and a second state; and
    (d) a lock member for locking the flash means at the first state, said lock member being linkable with the operation member after the lens protection member moves from the first position to the second position so as to release the locking of the flash means by the operation of the operation means.

7. In a camera, an improvement comprising:
    (a) a lens protection member provided on the camera so as to be movable between a first position at which said member protects the front surface of the photographing lens provided on the camera and a second position at which said surface retreats from the front surface of the photographing lens;
    (b) switching means to be exchanged from a first state into a second state during the displacement of the lens protection member when the lens protection member moves between the first and the second position; and
    (c) a check circuit for checking the voltage of the power source built in the camera, said check circuit checking the voltage of the power source when the switching means assumes the second state.

* * * * *